(12) United States Patent
Ide et al.

(10) Patent No.: US 11,661,081 B2
(45) Date of Patent: May 30, 2023

(54) CONTROL DEVICE FOR AUTOMATED DRIVING VEHICLE

(71) Applicant: Toyota Jidosha Kabushiki Kaisha, Toyota (JP)

(72) Inventors: Hirohito Ide, Nagoya (JP); Yuchi Yamanouchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 331 days.

(21) Appl. No.: 17/062,129

(22) Filed: Oct. 2, 2020

(65) Prior Publication Data

US 2021/0101615 A1 Apr. 8, 2021

(30) Foreign Application Priority Data

Oct. 4, 2019 (JP) .............................. JP2019-183706

(51) Int. Cl.
*B60W 60/00* (2020.01)
*G05D 1/00* (2006.01)
*B60W 50/10* (2012.01)

(52) U.S. Cl.
CPC ........ *B60W 60/0011* (2020.02); *B60W 50/10* (2013.01); *B60W 60/0021* (2020.02); *G05D 1/0016* (2013.01); *B60W 2556/50* (2020.02)

(58) Field of Classification Search
CPC ......... B60W 60/0011; B60W 60/0021; B60W 60/005; B60W 50/10; B60W 50/082; B60W 2556/50; G05D 1/0022
See application file for complete search history.

(56) References Cited

U.S. PATENT DOCUMENTS

| 10,377,375 | B2* | 8/2019 | Jones .................. B60W 30/095 |
| 2018/0224852 | A1* | 8/2018 | Tanahashi ............ G05D 1/0055 |
| 2019/0103028 | A1* | 4/2019 | Kobayashi ............ G06Q 50/30 |
| 2019/0265703 | A1 | 8/2019 | Hicok et al. |
| 2019/0291745 | A1* | 9/2019 | Sikorski ................ B60W 50/14 |
| 2019/0294162 | A1* | 9/2019 | Sikorski ............ B60W 50/0098 |

FOREIGN PATENT DOCUMENTS

| JP | 2003-024390 A | 1/2003 |
| JP | 2015-072651 A | 4/2015 |
| JP | 2017-182137 A | 10/2017 |
| JP | 2018-181058 A | 11/2018 |

* cited by examiner

*Primary Examiner* — Jacob M Amick
*Assistant Examiner* — Sherman D Manley
(74) *Attorney, Agent, or Firm* — Dinsmore & Shohl LLP

(57) ABSTRACT

A control device for an automated driving vehicle has a first automated driving mode in which the automated driving vehicle, receiving a permission notice from an operations management controller, travels, according to automatic operation, along a controlled route managed by the operations management controller, in accordance with a traveling schedule provided from the operations management controller; and a second automated driving mode in which the automated driving vehicle travels, without a permission notice from the operations management controller, along a non-controlled route that is not managed by the operations management controller, according to automatic operation. The first automated driving mode and the second automated driving mode are switchable.

6 Claims, 7 Drawing Sheets

CONTROL DEVICE FOR AUTOMATED DRIVING VEHICLE

CROSS REFERENCE TO RELATED APPLICATION

This application claims priority to Japanese Patent Application No. 2019-183706 filed on Oct. 4, 2019, which is incorporated herein by reference in its entirety including the specification, claims, drawings, and abstract.

TECHNICAL FIELD

The present disclosure relates to a control device for automated driving vehicles capable of communicating with an operations management controller.

BACKGROUND

Various types of automated driving vehicles that have been proposed include automated driving vehicles that communicate with a vehicle management controller and travel along a predetermined route in accordance with information from the vehicle management controller. Problems would arise in these automated driving vehicles when communication with the vehicle management controller is lost.

JP 2015-72651 A, for example, discloses that an automated driving vehicle is stopped when communication between the automated driving vehicle and a vehicle management server (vehicle management controller) is interrupted. JP 2015-72651 A further discloses that connectionless communication (also referred to as datagram communication) is set and manual driving is enabled when there are any occupants in an automated driving vehicle, whereas connectionless communication is set and automatic driving operation is enabled when there are no occupants in an automated driving vehicle.

SUMMARY

While the above-described technique allows, in case of interruption of communication, automatic driving control with connectionless communication being performed, this technique considers, as a precondition, automatic driving control by which vehicles travel along a preset route.

In some situations, it is desirable to use functions of automated driving vehicles more efficiently.

In an aspect of the disclosure, a control device for an automated driving vehicle capable of communicating with an operations management controller includes, as control modes for the automated driving vehicle, a first automated driving mode and a second automated driving mode. In the first automated driving mode, the automated driving vehicle, receiving a permission notice from the operations management controller, travels, according to automatic operation, along a controlled route managed by the operations management controller, in accordance with a traveling schedule provided from the operations management controller. In the second automated driving mode, the automated driving vehicle travels, without a permission notice from the operations management controller, along a non-controlled route that is not managed by the operations management controller, according to automatic operation. Switching between the first automated driving mode and the second automated driving mode is possible.

In the control device, a route along which the automated driving vehicle travels according to automatic operation may be selectable from among a plurality of routes including the controlled route and the non-controlled route, and when the non-controlled route is selected, the second automated driving mode may be selected.

In the second automated driving mode, the automated driving vehicle may travel, with communication with the operations management controller being restricted as compared to the case where the first automated driving mode is selected.

The traveling schedule may include a target arrival time to a predetermined location, and in the second automated driving mode, the automated driving vehicle may travel without receiving the traveling schedule.

According to the present disclosure, it is possible to change the automatic operation type depending on the situation, to thereby use functions of the automated driving vehicle more efficiently.

BRIEF DESCRIPTION OF DRAWINGS

An embodiment of the present disclosure will be described based on the following figures, wherein.

DESCRIPTION OF EMBODIMENTS

An embodiment of the disclosure will be described by reference to the drawings.

Entire System Configuration

Figure 1:
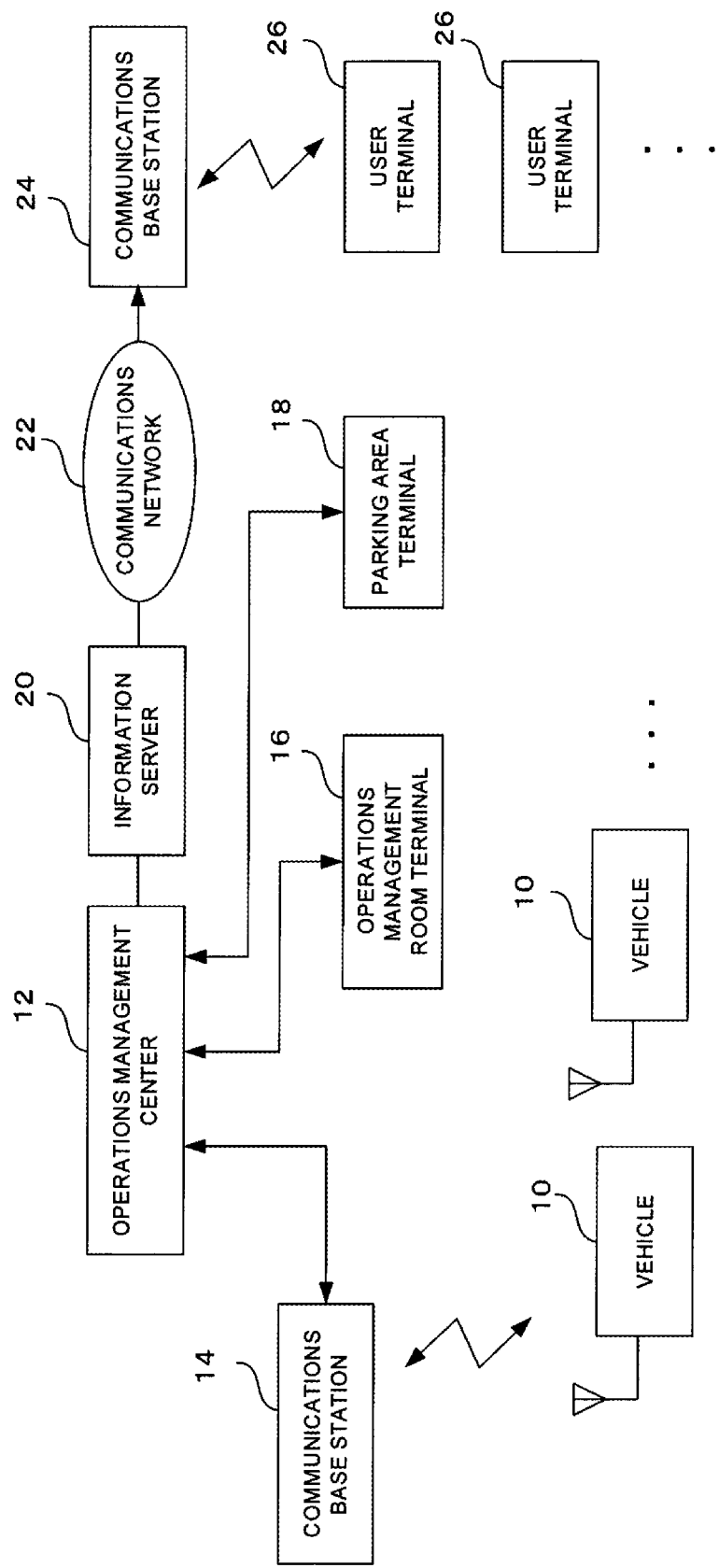
FIG. 1 is a block diagram illustrating the entire configuration of a vehicle operation system that operates automated driving vehicles.

FIG. 1 is a block diagram illustrating an overall configuration of a vehicle operation system that operates automated driving vehicles. In this system, a plurality of automated driving vehicles (hereinafter simply referred to as "vehicles") 10 travel along a controlled route selected from a plurality of predetermined controlled routes. Each of the vehicles 10 is, for example, a passenger bus to be operated along a determined route, and makes rounds of certain areas while stopping at stops such as bus stops. Here, the vehicle 10 travels along a selected one of a plurality of routes under operation (which will be referred to as controlled routes). The vehicle 10 is also allowed to automatically travel along a non-controlled route other than the controlled route.

An operations management center 12 includes a computer having a communication function, and manages operation of the vehicles 10. More specifically, the operations management center 12 manages operations of a plurality of vehicles 10 along the controlled route, including putting a vehicle 10 into service along the controlled route and removing a vehicle 10 out from service along the controlled route. When the remaining power of a battery mounted on the vehicle 10 is equal to or less than a predetermined value, the operations management center 12 removes the vehicle 10 out from the controlled route and guides the vehicle 10 into a parking area for charging. When a certain one of the vehicles 10 is removed from the controlled route, another one of the vehicles 10 is put into the controlled route.

The operations management center 12 further manages a traveling schedule that indicates when and where the respective vehicles 10 would travel. For example, the operations management center 12 calculates target time points when the respective vehicles would arrive at corresponding stops such that the plurality of vehicles would arrive at respective predetermined locations, such as the stops, at equal time intervals, and transmits the information to each vehicle 10. The operations management center 12 then controls acceleration and deceleration of the vehicles 10 such that each vehicle 10 would arrive at the stop at the target time point. The operations management center 12 may also continuously grasp the location of each vehicle 10 and transmit a command to each vehicle 10 as required such that the vehicle 10 can operate as scheduled. The operations management center 12 may transmit to the vehicle 10 a command concerning the travel speed, rather than the target time to arrive at a predetermined location, as required.

The operations management center 12 may also automatically create a plan for responding to an emergency such as breakdown of the vehicle 10, thereby putting an alternative vehicle 10 into service or controlling return of the vehicle 10 which has been temporarily stopped in emergency back to the controlled route.

While each vehicle 10, which stores map data and data concerning the controlled routes, is capable of steering automatically without manipulation by a passenger to automatically drive along the controlled route, the operations management center 12 may provide information concerning steering, or may control steering in certain situations.

The operations management center 12 is connected to a plurality of communications base stations 14, and the plurality of communications base stations 14 are connected to the plurality of vehicles 10 via wireless communication. Therefore, the vehicle 10 can travel in accordance with a command from the operations management center 12 while exchanging information with the operations management center 12 through communication.

The operations management center 12 is further connected to an operations management room terminal 16. The operations management room terminal 16 receives inputs of commands and data necessary in the operations management center 12, and provides information to a system operator by use of a display, for example.

The operations management center 12 is further connected to a parking area terminal 18. The parking area terminal 18 is disposed in a parking area where offline vehicles 10 that are not under automatic traveling operation are parked, and through the parking area terminal, necessary information associated with the parking area is input and output. The parking area includes a charging facility to charge a battery to be mounted in the vehicle 10 as required.

The operations management center 12 is also connected to an information server 20 that provides operation information of the vehicles 10 to users. The information server 20 is connected to a communications base station 24 via a communications network 22, and the communications base station 24 is connected to user terminals 26 via wireless communication. Each of the user terminals 26 may be a portable terminal, such as a smartphone, and can be used by a user who would get in the vehicle 10 to confirm the operating situation of the vehicle 10. A terminal is also disposed at each stop to display information on the vehicle 10 that would arrive at the stop next.

Vehicle Configuration

Figure 2:
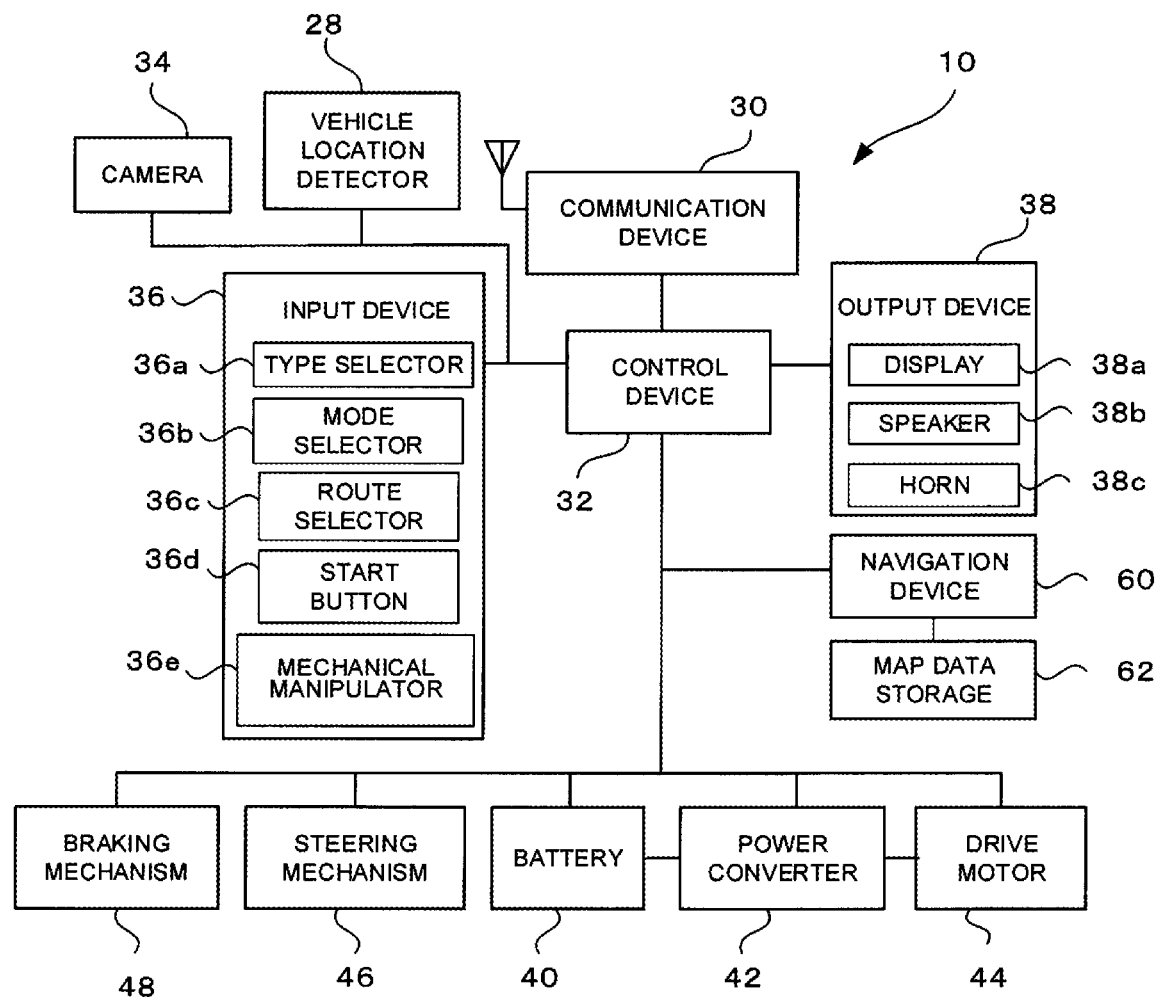
FIG. 2 is a block diagram illustrating a configuration of a vehicle 10 that operates automatically.

FIG. 2 is a block diagram illustrating a configuration of the vehicle 10 that operates automatically. The vehicle 10 has, as control modes for an automated driving vehicle, a first automated driving mode (AUTO type 1) in which the vehicle 10 automatically drives along the controlled route in accordance with a traveling schedule provided from the operations management center 12, and a second automated driving mode (AUTO type 2) in which the vehicle 10 automatically drives along a route other than the controlled route without following the traveling schedule provided from the operations management center 12. The term "automatic driving" as used herein generally refers to operation which causes a vehicle to travel automatically, such as steering or acceleration/deceleration without a driver's manipulation, for example.

A communication device 30 wirelessly communicates with the communications base station 14 to transmit and receive various types of information. The communication device 30 is connected to a control device 32, which processes information to be transmitted and received by the communication device 30. The control device 32 controls overall operation, including traveling of the vehicle 10.

The control device 32 is connected to a vehicle location detector 28, a camera 34, and an input device 36 used for entering input data. A vehicle location (present location) detected by the vehicle location detector 28, an image of a region around the vehicle 10 that is captured by the camera 34, a travel command concerning traveling that is input through the input device 36, and other data are supplied to the control device 32. The vehicle location detector 28, which includes a GPS device and a gyroscope, detects vehicle location information as required by using position information obtained from beacons along the travel route and transmitters at stops, for example. The detected vehicle location, the captured image of the peripheral region, and other information are supplied to the operations management center 12 as appropriate.

The input device 36 includes a type selector 36a for selecting the type of an automated driving mode, a mode selector 36b for selecting a mode such as a semiautomatic mode and a manual mode, a route selector 36c for selecting a route for traveling, a start button 36d for instructing start of the vehicle 10 at stops and other locations, and a mechanical manipulator 36e that is manipulated by an operator. The control device 32 is further connected to an output device 38 including a display 38a, a speaker 38b, and a horn 38c, from which necessary information is output. While the input device 36, the output device 38, and the manipulation units within these devices have been described individually, a touch panel serving as an input/output device may be used, and a single manipulating unit may be kept depressed to switch the manipulation functions.

The vehicle 10 further includes a navigation device 60 and a map data storage 62 to display a map of a region around the present location and set a route by using route search. Here, the map data may be externally supplied through communication. Further, the control device 32 may have the functions of the navigation device 60.

The vehicle 10 further includes a battery 40, a power converter 42, and a drive motor 44. Direct-current power from the battery 40 is converted to a desired alternating-current power by the power converter 42 and supplied to the drive motor 44 to drive the drive motor 44. The output from the drive motor 44 revolves wheels so that the vehicle 10 travels. Further, a steering mechanism 46 controls steering of the vehicle 10 and a braking mechanism 48 controls deceleration and stopping of the vehicle. The power converter 42, the steering mechanism 46, and the braking mechanism 48 are connected to the control device 32, which controls traveling (steering, and acceleration/deceleration) of the vehicle 10. Under the control of the power converter 42, regenerative braking of the drive motor 44 is also performed.

It is possible to control traveling of the vehicle 10 configured as described above such that the location detected by the vehicle location detector 28 corresponds to a target location. Thus, once a travel route is set, the vehicle 10 can automatically travel along the set route. It is also possible to detect an obstacle and the like by using 3D data stored in the map data storage 62 and images capture by the camera 34, for example, to thereby avoid collision by steering or braking. The vehicle 10 may also include an acceleration sensor concerning the traveling direction and turning (yaw) so that feedback control of the travel speed and steering may be provided.

In this example, the navigation device 60 stores information concerning the controlled routes, and the control device 32 may use the navigation device 60 to control automated driving along a controlled route and also control automated driving along a non-controlled route.

Controlled Route

Figure 3:
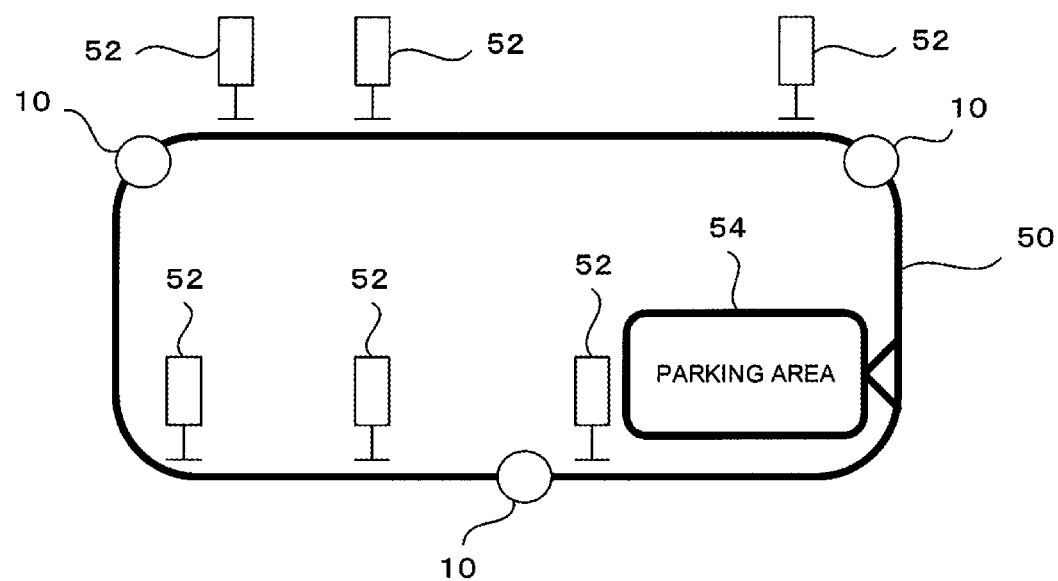
FIG. 3 schematically illustrates an example controlled route along which the vehicle 10 travels.

FIG. 3 schematically illustrates an example controlled route along which the vehicles 10 travel. In this example, a controlled route 50 is a circuit route, along which three vehicles 10 operate at substantially equal intervals. Stops 52 are disposed at appropriate intervals in accordance with passengers' usage. For example, one of the stops 52 is a stop for transfer to a bus stop on a route other than the controlled route 50 or to a train station, while another stop is close to the home of a certain passenger. The controlled route 50 is connected, at one location (an entrance/exit passage), to a parking area 54, such that the vehicle 10 is put into service from the parking area 54 to the controlled route 50 or removed from the controlled route 50 to the parking area 54.

Note that FIG. 3 illustrates the controlled route 50 only schematically, and an actual controlled route 50 is not that simple and includes, for example, intersections or turning points. The vehicle 10 may decelerate at an intersection and pass through the intersection while checking safety on a camera image or may stop at an intersection for safety check before turning right or left. These operations may be performed automatically or may be performed in accordance with manipulation performed by a certain passenger.

Automated Driving by First Automated Driving Mode on Controlled Route

The operation of a plurality of vehicles 10 along a controlled route is basically managed by the operations management center 12. Therefore, vehicle information for vehicles 10 under operation is stored, along with their identification numbers, in the operations management center 12. The operations management center 12 further stores the operation plan previously drafted using the operations management room terminal 16, for example. Specifically, a schedule includes, for example, sequentially putting a predetermined number of vehicles 10 into service along the controlled route 50 to start the operation, and whether to remove a certain vehicle 10 out from the controlled route 50 and put a stand-by vehicle 10 into service on the controlled route 50. More specifically, information regarding the remaining battery power is periodically provided from the vehicles 10 to the operations management center 12, such that a vehicle 10 with the remaining battery power below a set value is automatically replaced by a vehicle 10 which has been charged.

When the remaining battery power of a vehicle 10 is below the set value, the operations management center 12 issues a command to remove the vehicle 10 out to the parking area 54, and the vehicle 10 automatically travels to a removal location of the parking area 54 and stops. The operator may subsequently move the vehicle 10 to a parking location in the manual mode for charging. Meanwhile, a vehicle 10 to be put into service is driven by the operator in the manual mode to a service standby location in the parking area 54, where the vehicle 10 stops. Then, in response to an operation permission notice from the operations management center 12, the vehicle 10 may travel from the parking area 54 toward the controlled route 50. At this time, the operator's manipulation of a start button may be added as a condition for starting.

The travel schedule is used to control the vehicles 10 to travel basically with equal distance therebetween. Specifically, each vehicle 10 provides, as required, information regarding the vehicle location to the operations management center 12, which updates individual travel schedules as required such that all the vehicles 10 arrive at the stops at equal time intervals, and transmits the schedules to the respective vehicles 10. The vehicle 10 then controls the vehicle speed (acceleration and deceleration) in accordance with the travel schedule transmitted from the operations management center 12.

The operations management center 12 further determines the number of vehicles 10 to be operated in accordance with the state where the automated driving vehicles 10 are being used, and controls putting or removing of the vehicles 10 into or out from service.

The operations management center 12 may provide, to each vehicle 10, information regarding locations of other vehicles 10, so that the operator of each vehicle 10 may become aware of the operating situation of other vehicles and provide the information to users. Here, the operator of the vehicle 10 may be any occupant who manipulates the vehicle 10, and may be an occupant intended for vehicle manipulation or a passenger who is on board to reach a destination.

In the present embodiment, steering control in the automated driving mode is automatically performed based on the map data and the camera data. The travel schedule may provide a target arrival time at each stop or an arrival time at a target location other than a stop, or may provide a target travel speed.

As a user may wish the vehicle to arrive at stops at equal intervals, and as the time period in which the vehicles stop at respective stops cannot be determined uniformly, the target arrival time at the next stop may be transmitted after the vehicle starts from the current stop.

The vehicle, when approaching a stop, starts vehicle stop control at a predetermined location, and stops at the stop. After the vehicle stops, doors automatically open, and occupants get on and off. While a request from the occupant for stop need not be considered when the vehicle does not fail to stop at all the stops, the vehicle may stop in response to a stop request.

After the vehicle stops, the vehicle releases the stop and initiates start control to start in accordance with operator's start manipulation (manipulation of the start button 36*d*). Here, the vehicle 10 automatically stops and starts at the stop according to the prestored routine. Thereafter, the vehicle automatically travels with reference to the travel schedule from the operations management center 12.

Further, a route among a plurality of controlled routes along which the vehicle travels may be selected at the start of traveling.

Automatic Operation in Second Automated Driving Mode Along Non-Controlled Route In the present embodiment, the operations management center 12, which serves as an operations management controller, provides the second automated driving mode in which a vehicle travels by automatic operation along a non-controlled route for which the traveling schedule is not managed. In the second automated driving mode, communication with the operations management controller is more restricted as compared with the first automated driving mode described above. In the second automated driving mode, an operation permission is not required, and the vehicle does not receive a traveling schedule including a target arrival time to a predetermined point.

As described above, the vehicle 10 includes the vehicle location detector 28, the camera 34, and map data, and can travel along the travel route, which is determined, by automatic operation.

In the present embodiment, when the second automated driving mode is set, a non-controlled route may be set as a travel route by setting a destination, for example, and the vehicle can travel along the set non-controlled route in the automated driving mode.

In the second automated driving mode, in which the vehicle travels along a non-controlled route, the vehicle does not need to receive a driving schedule from the operations management center 12. The vehicle 10 therefore does not need to acquire an operation permission through communication with the operations management center 12. The vehicle further travels without receiving the traveling schedule including the target arrival time to a predetermined point. The vehicle may further accelerate or decelerate with reference to the recommended travel speed recorded in the map data. Here, steering of the vehicle 10 may be controlled such that the vehicle 10 may travel along the set travel route as in traveling along the controlled route.

As such, the second automated driving mode differs from the first automated driving mode in that, in the second automated driving mode, the vehicle does not require an operation permission from the operations management center 12 and does not receive the traveling schedule.

Here, in the second automated driving mode, the vehicle may obtain information from the operations management center 12 through communication, and may control acceleration/deceleration based on the information received from the operations management center 12.

In the present embodiment, the vehicle 10 automatically travels basically within a predetermined limited area (controlled area); in other areas including general roads, only the manual mode is permitted for traveling of the vehicle 10. The second automated driving mode (AUTO type 2) allows transportation of passengers or freight, rather than normal bus operation, along a specific route within the controlled area, to be performed by automated driving.

Operation Panel

While FIG. 2 illustrates the input device 36 and the display 38*a* serving as the output device 38 as individual components, a touch panel, for example, is often used as an input/output device. In this configuration, contact or proximity of an operator's finger onto the front face of the display 38*a* serving as the output device 38 is detected as an input.

Figure 4:
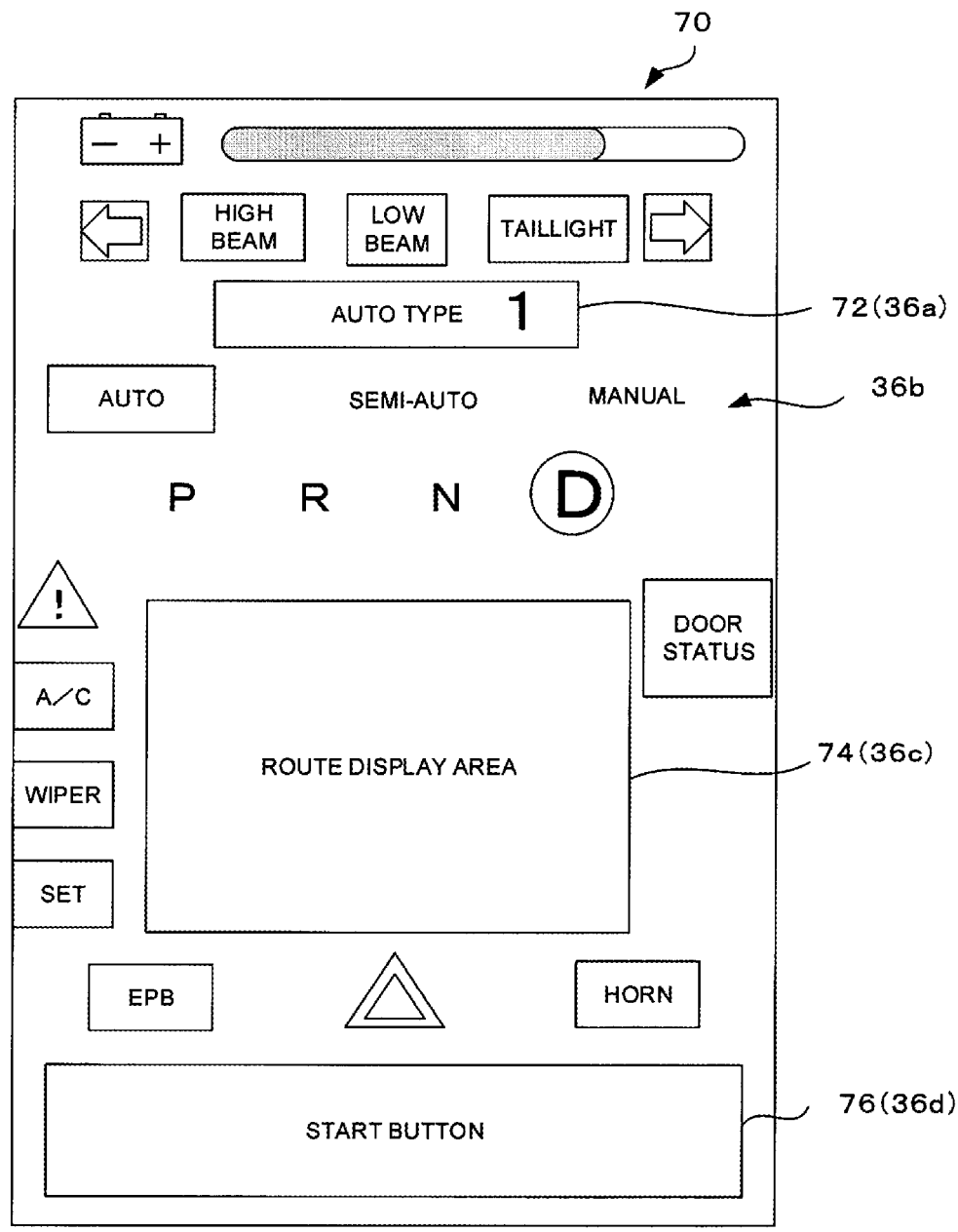
FIG. 4 illustrates an example configuration of a touch panel 70 serving as an input/output device.

FIG. 4 illustrates an example configuration of a touch panel 70 serving as an input/output device. The touch panel 70 includes a display screen that shows a battery mark on the left side at the top portion, and shows a bar, to the right of the battery mark, that indicates the remaining battery power. The display screen further shows blinker signs on the right and left ends below the battery mark and the remaining power bar, and operation indicator buttons for high beam and low beam and an operation indicator button for a tail lamp in the center.

The display screen shows, further below these operation indicator buttons, a type change button 72 serving as the type selector 36*a*. The type change button 72 switches between the first automated driving mode (AUTO type 1) and the second automated driving mode (AUTO type 2); each depression of the button changes the selected type between the "AUTO type 1" and the "AUTO type 2" as well as its indication. The indication is turned off when the current mode is not automatic (AUTO) mode. Alternatively, buttons for the "AUTO type 1" and the "AUTO type 2" may be individually provided and manipulated. FIG. 4 illustrates a state where the "AUTO type 1" is selected.

The display screen further shows, as the mode selector 36*b*, below the type change button 72, three mode selection buttons for an automatic (AUTO) mode, a semiautomatic (SEMI-AUTO) mode, and a manual (MANUAL) mode, any one of which is manipulated for mode selection.

The display screen further shows, below the mode selection buttons, manipulation indication buttons for gearshifting, among which indication for the current gearshifting is enlarged and illuminated.

The display screen further shows, below the manipulation indication buttons, a route display area 74 as the route selector 36*c*, in which various display manipulation buttons, including buttons for route display and destination selection display, can be displayed. On the left and below this route display area 74, display operation buttons for various devices are provided.

The display screen further shows, at the bottom portion, a start button 36*d* (76). The start button 76 is used to confirm the operator's intention to start the vehicle, by the operator's manipulation; the vehicle 10 starts by operator's manipulation of the start button 76 in a state where preparation for start is completed.

Setting of AUTO Type

Figure 5:
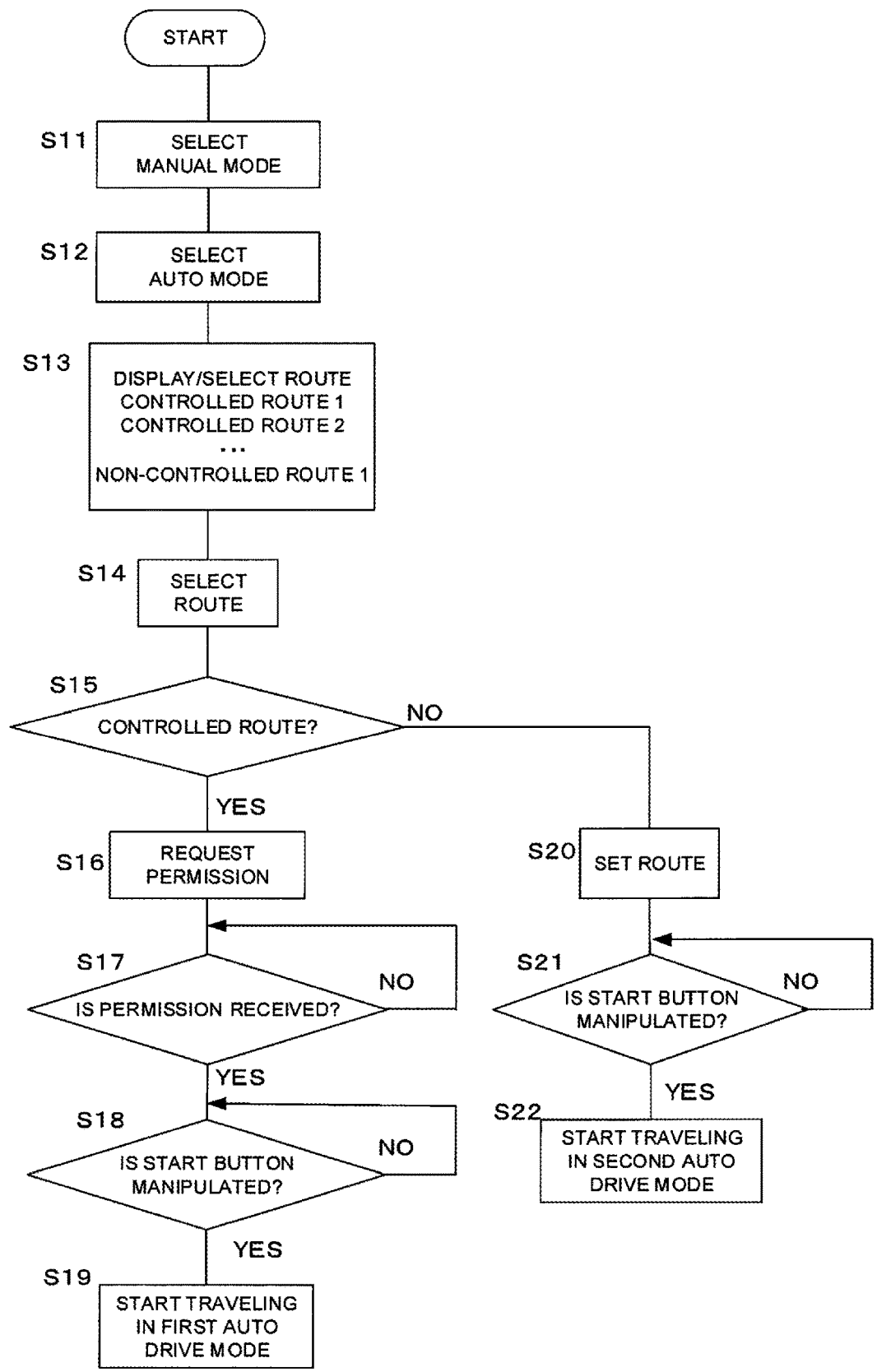
FIG. 5 is a flowchart illustrating operations for determining AUTO types including a first automated driving mode (AUTO type 1) and a second automated driving mode (AUTO type 2)

FIG. 5 is a flowchart showing the operation for determining the AUTO type, the first automated driving mode (AUTO type 1) or the second automated driving mode (AUTO type 2), and FIGS. 6A-6D illustrate screen display during the operation indicated in FIG. 5.

Figure 6B:
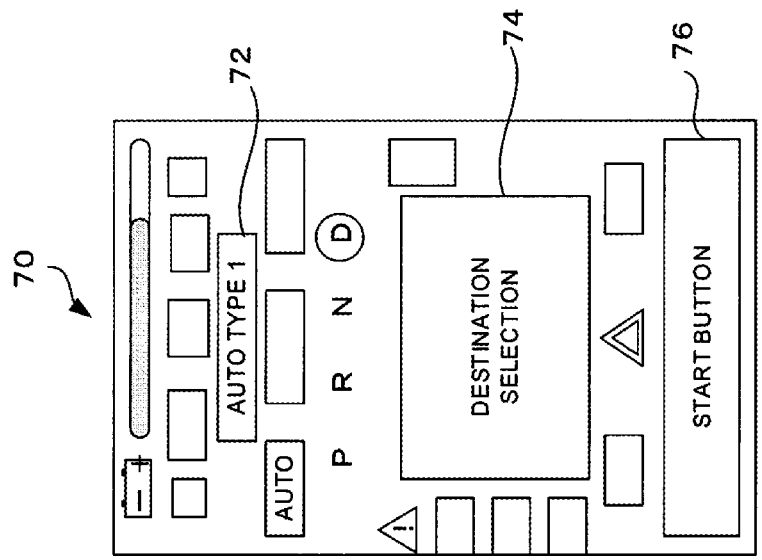
FIG. 6B illustrates a screen display for the operations illustrated in FIG. 5.
Figure 6A:
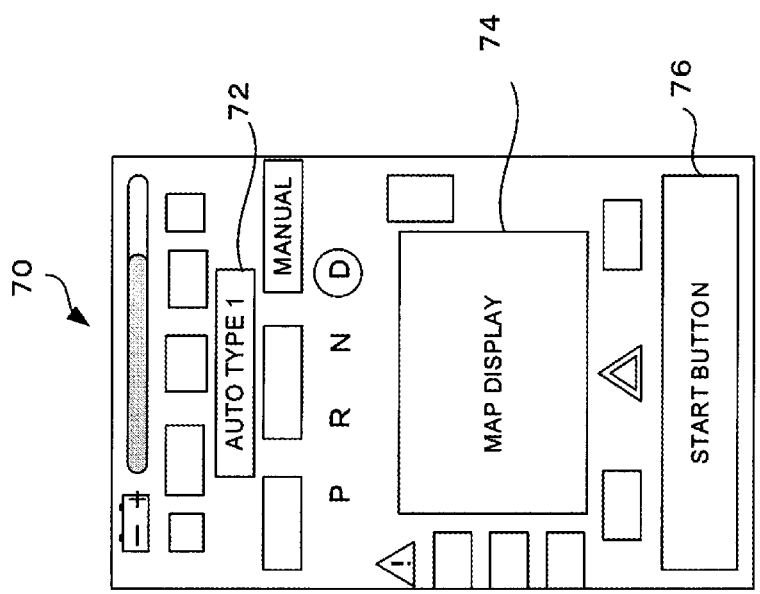
FIG. 6A illustrates a screen display for the operations illustrated in FIG. 5.

First, when the vehicle 10 is actuated in the parking area, the manual (MANUAL) mode is selected (S11). As illustrated in FIG. 6A, indication for the manual mode is selected, and the route display area 74 shows a map of the current location and its surrounding area and a current location map, for example.

In this state, the vehicle 10 is moved, by the operator's manipulation, to a predetermined service standby location located near an exit of the parking area 54. At this time, the vehicle 10 may be automatically moved from its parking location to the service standby location.

When the vehicle 10 stops in the service standby area, the operator then manipulates the automatic (AUTO) mode button (S12). This manipulation results in selection of the automatic mode (AUTO mode) and selection of the AUTO type 1, as illustrated in FIG. 6B. Depressing the AUTO type button 72 in this state sequentially changes the type between the AUTO type 1 and the AUTO type 2.

Then, the automatic (AUTO) mode button is further manipulated, for example, such that the route display area 74 displays a destination selection screen (S13). For example, the route display area 74 displays a plurality of preset routes in a controlled area in a selectable manner. In this example, it is possible to select a non-controlled route as a destination.

Once a route is selected (S14), whether or not the selected route is a controlled route is then determined (S15).

Figure 6D:
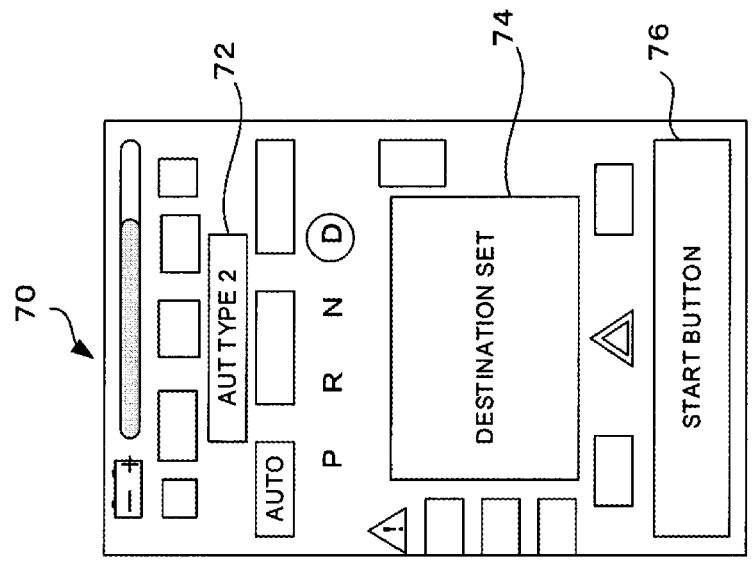
FIG. 6D illustrates a screen display for the operations illustrated in FIG. 5.
Figure 6C:
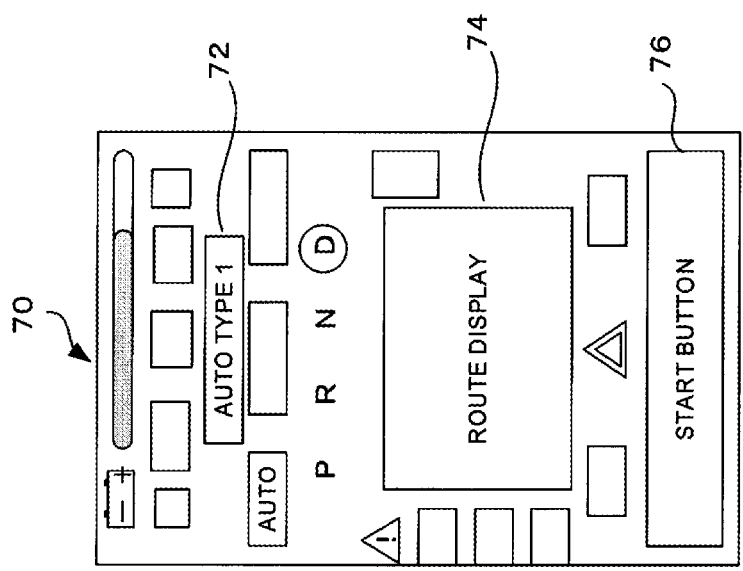
FIG. 6C illustrates a screen display for the operations illustrated in FIG. 5.

If YES is determined in step S15, a controlled route is set as a travel route, and the route display area 74 displays the selected controlled route, as illustrated in FIG. 6C.

Subsequently, the vehicle 10 transmits an operation permission request for the selected route to the operations management center 12 (S16). If the vehicle 10 receives an operation permission notice from the operations management center 12 (YES in step S17), the vehicle 10 is placed in a traveling start standby state in the first automated driving mode.

Then, if the traveling start button is manipulated by the operator (YES in step S18), traveling along the selected controlled route in the first automated driving mode 1 is started (S19). Here, the operator may allow the vehicle to automatically start after confirming safety, in place of manipulation of the start button 76.

If NO is determined in step S15; that is, if the selected route is not a controlled route, the AUTO type 2 is selected, and the route display area 74 displays a destination setting screen, on which a destination and a route to the destination are set, as illustrated in FIG. 6D (S20). When a route is set, upon manipulation of the start button 76 by the operator (YES in step S21), the vehicle 10 is allowed to automatically travel to the destination in the second automated driving mode in step S22. Here, the operator may allow the vehicle to automatically start after confirming safety, in place of manipulation of the start button 76.

In step S12, further manipulation of the automatic mode button (AUTO) or manipulation of the AUTO type button 72 in a state where the automatic operation (AUTO) mode has been selected may change the type to the AUTO type 2. In this case, the route selection display screen in step S13 may include separate screens for the first automated driving mode and for the second automated driving mode. Further, if YES is not determined after elapse of a predetermined time in steps S17, S18, and S21, appropriate processing, such as terminating the process, may be performed.

As described above, as, in the present embodiment, the area in which the vehicle 10 automatically travels is basically limited to an area within the predetermined controlled area, destinations are also limited in destination setting. Here, a button for selecting an area outside the controlled area may be provided; if so, it may be the case that only a manual mode is selectable.

In the present embodiment, a vehicle can automatically travel in the first automated driving mode or in the second automated driving mode 2, which is selected as appropriate, in the automated driving mode, as described above. In particular, the second automated driving mode (AUTO type 2) allows the vehicle to perform automatic traveling directly to desired locations for necessary transportation such as transportation of passengers or freight, rather than normal bus operations, within the controlled area.

Semiautomatic Mode

In the present embodiment, the vehicle may travel in a semiautomatic mode. The semiautomatic mode is selected in the case of communication fault, for example, and restricts at least part of the automatic operating functions.

In the semiautomatic mode, the vehicle accelerates by the operator's manipulation during the travel. More specifically, while in the semiautomatic mode, the vehicle accelerates and decelerates according to the operator's manipulation, and it may decelerate automatically.

As such, the vehicle would not basically accelerate without an operator's acceleration request. The vehicle, approaching the intersection, automatically decelerates, passes through the intersection at a predetermined speed, and accelerates in response to the operator's acceleration request after having passed the intersection. The vehicle, approaching a stop, automatically executes a stop sequence and stops at the stop. The vehicle further starts from the stop and accelerates according to the operator's manipulation.

Here, the vehicle may automatically accelerate up to a predetermined speed at the start or after deceleration. For example, in response to depression of the start button 36d by the operator, the vehicle may execute the start sequence to automatically accelerate up to a predetermined speed (e.g., 10 km/h) and then further accelerate in response to the operator's acceleration request.

Manual Mode

The vehicle 10 also travels in the manual mode. In this manual mode, unlike the automatic mode or the semiautomatic mode, the vehicle does not travel automatically, but performs steering or acceleration/deceleration according to the operator's manipulation. The automatic mode, the semiautomatic mode, and the manual mode may have the same upper limit speed (e.g., 20 km/h) or individually set upper limit speeds. The vehicle may be decelerated by the mechanical manipulator 36e by using both regenerative braking of the drive motor 44 and a mechanical brake as appropriate. A mechanical or electrical parking brake may be separately provided.

As described above, the second automated driving mode allows the vehicle to automatically travel along a route other than a predetermined travel route according to the operator's determination. This makes it possible to flexibly address unexpected situations or various usages.

The invention claimed is:
1. A control device for an automated driving vehicle capable of communicating with an operations management controller, the control device having, as control modes for the automated driving vehicle, a manual operation mode in which the automated driving vehicle is steered by an operator, and an automatic operation mode in which the control device steers the vehicle automatically without operation by the operator, when the automatic operation mode is selected, the control device presents a plurality of routes to be traveled in the automatic operation mode, the plurality of routes including a controlled route and a non-controlled route, when the controlled route is selected, the control device sends a request for permission to the operations management controller, and when the control device receives a permission notice from the operations management controller and a start button is operated, the control device causes the automated vehicle to travel, according to automatic operation, along a controlled route managed by the operations management controller, in accordance with a traveling schedule provided from the operations management controller and including a target arrival time at a predetermined point; and when the non-controlled route is selected, a route to a destination is set according to the operation of the operator, and when the start button is operated, the control device causes the automated vehicle to travel, without the permission notice from the operations management controller, along a non-controlled route that is not managed by the operations management controller, according to automatic operation.

2. The control device for an automated driving vehicle according to claim 1, wherein
a route along which the automated driving vehicle travels according to automatic operation is selectable from among a plurality of routes including the controlled route and the non-controlled route, and when the non-controlled route is selected, the second automated driving mode is selected.

3. The control device for an automated driving vehicle according to claim 1, wherein
in the second automated driving mode, the automated driving vehicle travels with communication with the operations management controller being restricted as compared with the case where the first automated driving mode is selected.

4. The control device for an automated driving vehicle according to claim 3, wherein
the traveling schedule includes a target arrival time to a predetermined location, and
in the second automated driving mode, the automated driving vehicle travels without receiving the traveling schedule.

5. The control device for an automated driving vehicle according to claim 2, wherein
in the second automated driving mode, the automated driving vehicle travels with communication with the operations management controller being restricted as compared with the case where the first automated driving mode is selected.

6. The control device for an automated driving vehicle according to claim 5, wherein
the traveling schedule includes a target arrival time to a predetermined location, and
in the second automated driving mode, the automated driving vehicle travels without receiving the traveling schedule.

* * * * *